US012251978B2

(12) United States Patent
Dhaens et al.

(10) Patent No.: US 12,251,978 B2
(45) Date of Patent: Mar. 18, 2025

(54) SINGLE AXLE ROLL CONTROL SYSTEM THAT INCLUDES A DUAL CHAMBER BALL-SCREW MECHANISM

(71) Applicant: DRiV Automotive Inc., Northville, MI (US)

(72) Inventors: Miguel Dhaens, Lommel (BE); Monzer Al Sakka, Sint-Truiden (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 18/197,138

(22) Filed: May 15, 2023

(65) Prior Publication Data

US 2024/0383306 A1    Nov. 21, 2024

(51) Int. Cl.
*B60G 21/073*   (2006.01)
*B60G 9/02*   (2006.01)
(Continued)

(52) U.S. Cl.
CPC ............ *B60G 21/073* (2013.01); *B60G 9/02* (2013.01); *B60G 13/08* (2013.01); *B60G 17/08* (2013.01);
(Continued)

(58) Field of Classification Search
CPC .................................................. B60G 21/073
See application file for complete search history.

(56) References Cited

U.S. PATENT DOCUMENTS 2,503,016 A   4/1950   Weeks et al.
3,328,019 A   6/1967   Wilson
(Continued)

FOREIGN PATENT DOCUMENTS

CN   105857007 A      8/2016
CN   109927692 A  *   6/2019
(Continued)

OTHER PUBLICATIONS

U.S. Appl. No. 18/197,126, filed May 15, 2023, Miquel Dhaens et al.
(Continued)

*Primary Examiner* — Nicole T Verley
(74) *Attorney, Agent, or Firm* — Harness, Dickey & Pierce, P.L.C.

(57) ABSTRACT

A single axle suspension system including right and left dampers, first and second hydraulic circuits, and a first pressurizing mechanism connected in fluid communication with the first and second hydraulic circuits. The first pressurizing mechanism includes a dual chamber ball/screw mechanism to adjust the volumetric capacity of a pair of first and second variable volume chambers that are arranged in fluid communication with the first and second hydraulic circuits. Thus, the first pressurizing mechanism provides roll control by generating a pressure differential between the first and second hydraulic circuits, which causes an increase in the fluid pressure inside either the first working chamber of the right damper and the second working chamber of the left damper or inside the first working chamber of the left damper and the second working chambers of the right damper to provide roll stiffness that counters vehicle roll during cornering.

20 Claims, 2 Drawing Sheets

(51) Int. Cl.
  *B60G 13/08* (2006.01)
  *B60G 17/08* (2006.01)
  *F15B 21/00* (2006.01)
  *B60G 17/015* (2006.01)
  *B60G 17/016* (2006.01)

(52) U.S. Cl.
  CPC ........ *F15B 21/005* (2013.01); *B60G 17/0152* (2013.01); *B60G 17/0162* (2013.01); *B60G 2202/24* (2013.01); *B60G 2204/62* (2013.01); *B60G 2204/82* (2013.01); *B60G 2204/8304* (2013.01); *B60G 2206/41* (2013.01); *B60G 2500/104* (2013.01); *B60G 2600/182* (2013.01); *B60G 2800/012* (2013.01); *B60G 2800/9122* (2013.01)

(56) References Cited

U.S. PATENT DOCUMENTS

| | | | |
|---|---|---|---|
| 3,475,059 A | 10/1969 | Klein | |
| 3,752,497 A * | 8/1973 | Enke | B60G 17/0152 280/5.509 |
| 3,871,635 A | 3/1975 | Unruh et al. | |
| 3,921,746 A | 11/1975 | Lewus | |
| 4,295,538 A | 10/1981 | Lewus | |
| 4,741,206 A | 5/1988 | Ishiguro et al. | |
| 5,562,305 A | 10/1996 | Heyring et al. | |
| 5,573,388 A | 11/1996 | Tar et al. | |
| 5,682,980 A | 11/1997 | Reybrouck | |
| 5,899,472 A | 5/1999 | Burke et al. | |
| 6,010,139 A | 1/2000 | Heyring et al. | |
| 6,196,555 B1 | 3/2001 | Gaibler | |
| 6,669,208 B1 | 12/2003 | Monk et al. | |
| 7,240,906 B2 | 7/2007 | Klees | |
| 7,384,054 B2 | 6/2008 | Heyring et al. | |
| 7,686,309 B2 | 3/2010 | Munday et al. | |
| 7,751,959 B2 | 7/2010 | Boon et al. | |
| 7,909,341 B2 | 3/2011 | Van Der Knaap | |
| 7,959,164 B2 | 6/2011 | Keane et al. | |
| 8,123,235 B2 * | 2/2012 | Monk | B60G 21/06 280/124.161 |
| 8,544,863 B2 | 10/2013 | Revill et al. | |
| 8,967,629 B2 * | 3/2015 | Oshita | B60G 17/033 280/124.16 |
| 9,352,633 B2 | 5/2016 | Kim | |
| 10,358,010 B2 | 7/2019 | Boon et al. | |
| 10,434,835 B2 | 10/2019 | Six et al. | |
| 10,589,591 B2 | 3/2020 | Sakka et al. | |
| 10,850,586 B2 | 12/2020 | Sorniotti et al. | |
| 11,084,349 B2 | 8/2021 | Dhaens et al. | |
| 11,117,435 B2 | 9/2021 | Liebold et al. | |
| 11,192,424 B2 | 12/2021 | Tabata et al. | |
| 11,220,152 B2 | 1/2022 | Witte | |
| 11,338,637 B2 | 5/2022 | Dhaens et al. | |
| 11,351,829 B2 | 6/2022 | Stahl | |
| 11,351,830 B2 | 6/2022 | Sorniotti et al. | |
| 11,376,917 B2 | 7/2022 | Simon et al. | |
| 11,541,797 B2 | 1/2023 | Dhaens | |
| 11,577,572 B2 | 2/2023 | Dhaens | |
| 11,679,820 B2 | 6/2023 | Streit | |
| 11,685,220 B2 | 6/2023 | Calchand et al. | |
| 11,794,542 B2 | 10/2023 | Boulay et al. | |
| 11,865,887 B2 | 1/2024 | Boon et al. | |
| 11,970,034 B2 | 4/2024 | Kalnitski et al. | |
| 2003/0015463 A1 | 1/2003 | Viken | |
| 2004/0113377 A1 | 6/2004 | Klees | |
| 2006/0287791 A1 | 12/2006 | Boon et al. | |
| 2007/0170680 A1 | 7/2007 | Knaap | |
| 2012/0098216 A1 | 4/2012 | Ryan et al. | |
| 2012/0305347 A1 | 12/2012 | Mori et al. | |
| 2013/0074487 A1 | 3/2013 | Herold et al. | |
| 2014/0225336 A1 | 8/2014 | Ryan et al. | |
| 2014/0232082 A1 | 8/2014 | Oshita et al. | |
| 2018/0162188 A1 | 6/2018 | Chikamatsu et al. | |
| 2018/0229574 A1 | 8/2018 | Okimura | |
| 2018/0345747 A1 | 12/2018 | Boon et al. | |
| 2019/0225044 A1 | 7/2019 | Witte | |
| 2019/0263213 A1 | 8/2019 | Sakka et al. | |
| 2019/0305558 A1 | 10/2019 | Abaitancei et al. | |
| 2020/0062069 A1 | 2/2020 | Sorniotti et al. | |
| 2020/0180386 A1 | 6/2020 | Tabata et al. | |
| 2020/0238780 A1 | 7/2020 | Dhaens et al. | |
| 2020/0238876 A1 | 7/2020 | Dhaens | |
| 2020/0247207 A1 | 8/2020 | Dhaens et al. | |
| 2021/0023902 A1 | 1/2021 | Sorniotti et al. | |
| 2021/0061046 A1 | 3/2021 | Simon et al. | |
| 2021/0155068 A1 | 5/2021 | Stabel | |
| 2021/0362557 A1 | 11/2021 | Stahl | |
| 2022/0001713 A1 | 1/2022 | Huth et al. | |
| 2022/0144035 A1 | 5/2022 | Al Sakka et al. | |
| 2022/0281278 A1 | 9/2022 | Boulay et al. | |
| 2022/0281280 A1 | 9/2022 | Praet et al. | |
| 2022/0380004 A1 | 12/2022 | Walker et al. | |
| 2022/0410647 A1 | 12/2022 | Dhaens | |
| 2023/0110337 A1 | 4/2023 | Calchand et al. | |
| 2023/0111977 A1 * | 4/2023 | Boon | B60G 17/01908 701/37 |
| 2023/0112405 A1 * | 4/2023 | Calchand | B60G 11/265 280/5.515 |
| 2023/0113819 A1 | 4/2023 | Vandersmissen et al. | |
| 2023/0114717 A1 | 4/2023 | Boon et al. | |
| 2023/0115594 A1 | 4/2023 | Calchand et al. | |
| 2023/0278387 A1 | 9/2023 | Birch et al. | |
| 2023/0302865 A1 | 9/2023 | Tong et al. | |
| 2023/0302866 A1 | 9/2023 | Tong et al. | |
| 2023/0302867 A1 | 9/2023 | Tong et al. | |

FOREIGN PATENT DOCUMENTS

| | | | | |
|---|---|---|---|---|
| CN | 111140567 A | | 5/2020 | |
| DE | 3936987 A1 | * | 11/1989 | |
| DE | 19853876 A1 | | 5/2000 | |
| DE | 102008027134 A1 | | 12/2009 | |
| DE | 102009010850 A1 | | 9/2010 | |
| DE | 102010021029 A1 | * | 11/2011 | ........... B60G 21/073 |
| DE | 102010045031 A1 | * | 3/2012 | ........... B60G 21/073 |
| DE | 102010054908 A1 | * | 6/2012 | ......... B60G 17/0416 |
| DE | 102015214429 A1 | | 2/2017 | |
| DE | 102017214264 A1 | | 2/2019 | |
| EP | 4032732 A1 | | 7/2022 | |
| FR | 2907377 B1 | | 1/2012 | |
| GB | 2238990 A | | 6/1991 | |
| GB | 2315248 A | | 1/1998 | |
| GB | 2597454 A | | 2/2022 | |
| GB | 2597455 A | | 2/2022 | |
| JP | 2005059613 A | | 3/2005 | |
| JP | 2006056499 A | * | 3/2006 | |
| JP | 2010522112 A | | 7/2010 | |
| JP | 4539283 B2 | * | 9/2010 | |
| JP | 5929628 B2 | | 6/2016 | |
| KR | 20160093421 A | | 8/2016 | |
| KR | 20200060949 A | | 6/2020 | |

OTHER PUBLICATIONS

U.S. Appl. No. 18/197,130, filed May 15, 2023, Miquel Dhaens et al.

U.S. Appl. No. 18/197,133, filed May 15, 2023, Miquel Dhaens et al.

U.S. Appl. No. 18/197,142, filed May 15, 2023, Miquel Dhaens et al.

U.S. Appl. No. 18/324,486, filed May 26, 2023, Miquel Dhaens et al.

* cited by examiner

SINGLE AXLE ROLL CONTROL SYSTEM THAT INCLUDES A DUAL CHAMBER BALL-SCREW MECHANISM

FIELD

The present disclosure relates generally to suspension systems for motor vehicles and more particularly to single axle suspension systems that replace or augment mechanical stabilizer bars/anti-roll bars.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean during corning (i.e., in turns). The lateral acceleration the vehicle experiences in turns causes a roll moment where the vehicle will lean/squat to the right when turning left and to the left when turning right. The roll moment decreases grip and cornering performance and also can be uncomfortable to the driver and passengers. Many vehicles are equipped with stabilizer bars/anti-roll bars, which are mechanical systems that help counteract the roll moment experienced during cornering. Stabilizer bars/anti-roll bars are typically mechanical linkages that extend laterally across the width of the vehicle between the right and left dampers. When one of the dampers extends, the stabilizer bar/anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the right and left dampers. Second, stabilizer bars/anti-roll bars are reactive and therefore only work when the suspension starts moving (i.e. leaning). Such mechanical systems do not limit body roll the moment a turn is initiated. Accordingly, there remains a need for improved vehicle suspension systems that can augment or replace traditional mechanical stabilizer bars/anti-roll bars.

SUMMARY

This section provides a general summary of the disclosure, and is not a comprehensive disclosure of its full scope or all of its features.

In accordance with one aspect of the subject disclosure, a single axle suspension system is provided. The single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The first working chamber of the right damper is connected in fluid communication with the second working chamber of the left damper by a first hydraulic circuit. The second working chamber of the right damper is connected in fluid communication with the first working chamber of the left damper by a second hydraulic circuit. A first pressurizing mechanism is connected in fluid communication with the first and second hydraulic circuits. In particular, the first pressurizing mechanism includes a first variable volume chamber that is arranged in fluid communication with the first hydraulic circuit, a second variable volume chamber that is arranged in fluid communication with the second hydraulic circuit, and a ball/screw mechanism that is arranged to increase and decrease the volumetric capacity of each of the first and second variable volume chambers. By adjusting the volumetric capacity (i.e., the size) of the first and second variable volume chambers, the ball/screw mechanism of the first pressurizing mechanism generates a pressure differential between the first and second hydraulic circuits independent of damper movements and therefore adjusts the roll resistance of the single axle suspension system.

In accordance with another aspect of the present disclosure, the single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The single axle suspension system includes a first hydraulic line that extends between and fluidly connects the first working chamber of the right damper and the second working chamber of the left damper and a second hydraulic line that extends between and fluidly connects the second working chamber of the right damper and the first working chamber of the left damper. A first pressurizing mechanism is connected in fluid communication with the first and second hydraulic circuits. In particular, the first pressurizing mechanism includes a first variable volume chamber that is arranged in fluid communication with the first hydraulic circuit, a second variable volume chamber that is arranged in fluid communication with the second hydraulic circuit, and a ball/screw mechanism that is arranged to increase and decrease the volumetric capacity of each of the first and second variable volume chambers. By adjusting the volumetric capacity (i.e., the size) of the first and second variable volume chambers, the ball/screw mechanism of the first pressurizing mechanism generates a pressure differential between the first and second hydraulic circuits independent of damper movements and therefore adjusts the roll resistance of the single axle suspension system.

In accordance with another aspect of the present disclosure, the single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The first working chamber of the right damper is connected in fluid communication with the second working chamber of the left damper by a first hydraulic circuit. The second working chamber of the right damper is connected in fluid communication with the first working chamber of the left damper by a second hydraulic circuit. A first pressurizing mechanism is connected in fluid communication with the first and second hydraulic circuits. In particular, the first pressurizing mechanism includes a first variable volume chamber that is arranged in fluid communication with the first hydraulic circuit, a second variable volume chamber that is arranged in fluid communication with the second hydraulic circuit, and a ball/screw mechanism that is arranged to increase and decrease the volumetric capacity of each of the first and second variable volume chambers. By adjusting the volumetric capacity (i.e., the size) of the first and second variable volume chambers, the ball/screw mechanism of the first pressurizing mechanism generates a pressure differential between the first and second hydraulic circuits independent of damper movements and therefore adjusts the roll resistance of the single axle suspension system. A second pressurizing mechanism is also connected in fluid communication with the first and second hydraulic circuits. In particular, the second pressurizing mechanism includes a bi-directional pump that is connected in fluid communication with a reservoir and the first and second hydraulic circuits to selectively increase or decrease static pressure in the first and second hydraulic circuits by adding or removing hydraulic fluid to and from the first and second hydraulic circuits.

Advantageously, the single axle suspension systems described herein are able to reduce/eliminate vehicle roll while cornering for improved grip, performance, handling, and braking. The reduction of roll angles improves the comfort, steering feel, agility, and stability of the vehicle. Roll control is provided by actuating the first pressurizing mechanism to increase the roll stiffness of the suspension system based on static pressure in the system. Because the first pressurizing mechanism actively adjusts roll stiffness of the vehicle by changing the static pressure in the system when greater roll stiffness is need, the baseline roll stiffness can be reduced compared to a vehicle with a conventional anti-roll bar. Therefore, ride comfort and suspension compliance is improved. Comfort is also improved because the active forces are independent of the damping forces. Anti-roll stiffness can also be applied to reduce body oscillations (e.g. sway) resulting in improved comfort. Finally, the single axle suspension systems described herein provide anti-roll control and therefore can augment or replace mechanical stabilizer bars/anti-roll bars.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
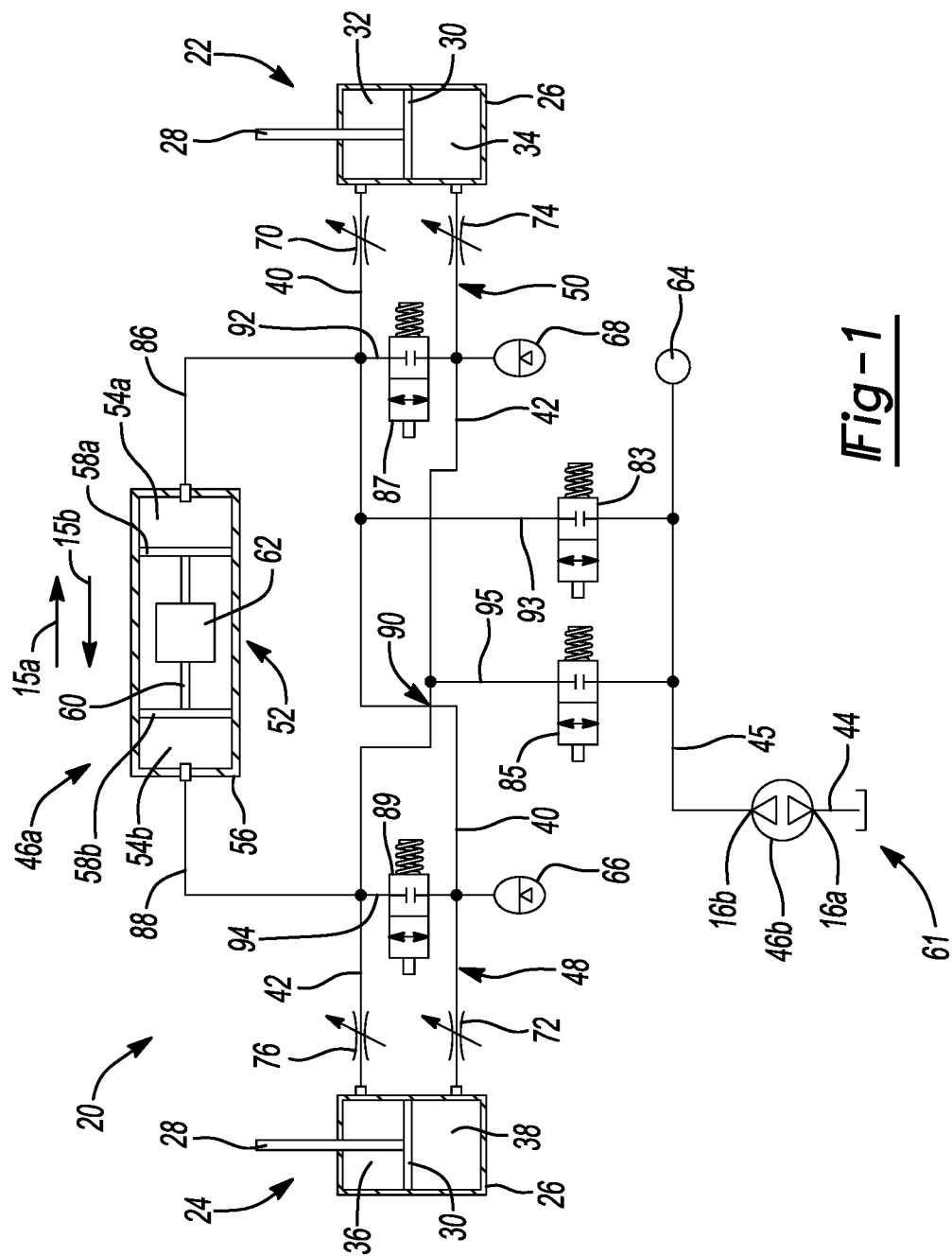
FIG. 1 is a schematic diagram illustrating an exemplary single axle suspension system that is constructed in accordance with the present disclosure, where the single axle suspension system includes two pressurizing mechanisms in the form of a bi-directional pump and a dual chamber ball-screw mechanism with a pair of driven pistons.

Referring to the Figures, wherein like numerals indicate corresponding parts throughout the several views, a number of single axle suspension system are disclosed.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
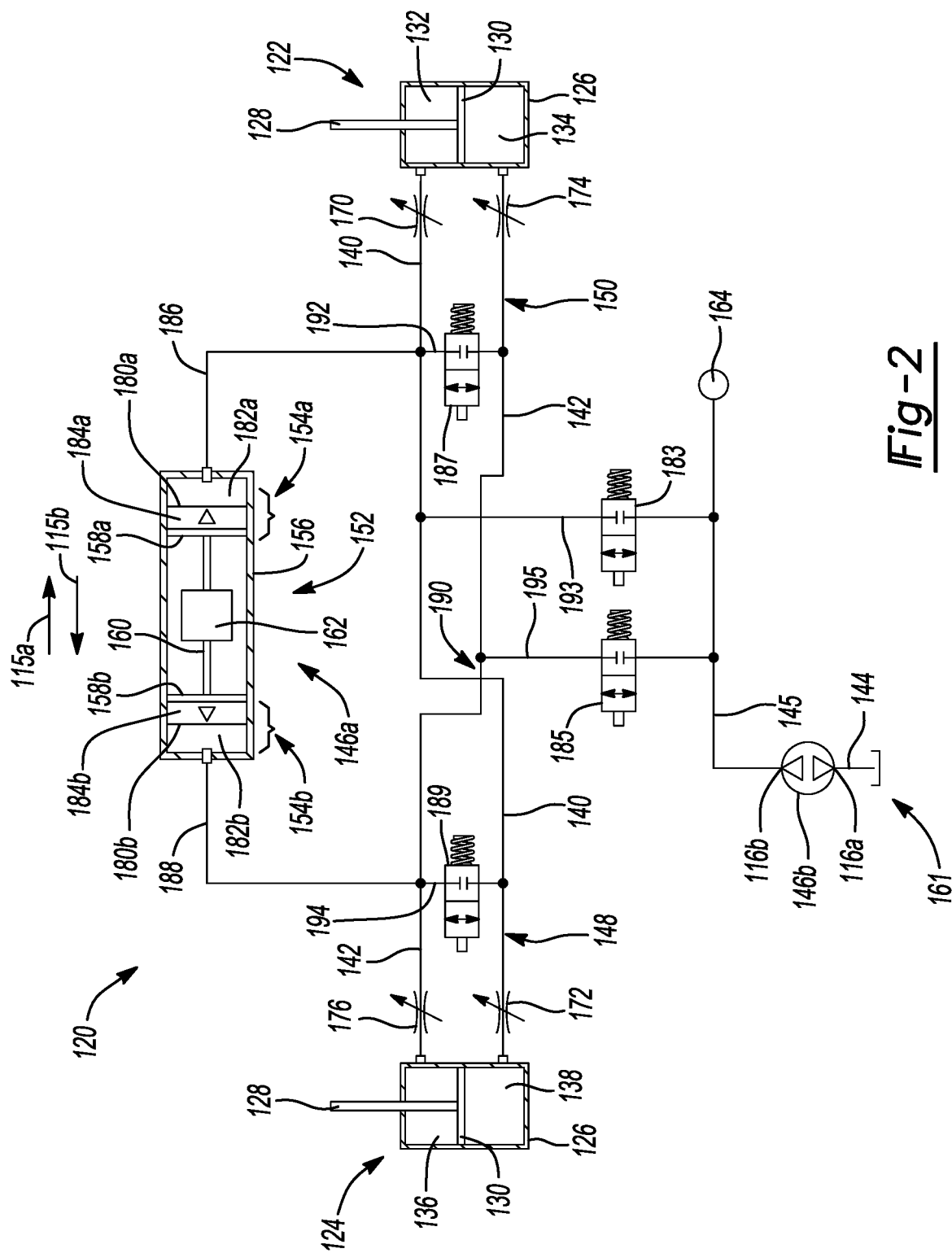
FIG. 2 is a schematic diagram illustrating another exemplary single axle suspension system that is constructed in accordance with the present disclosure, where the single axle suspension system includes two pressurizing mechanisms in the form of a bi-directional pump and a dual chamber ball-screw mechanism with a pair of driven pistons and a pair of floating pistons such that the dual chamber ball-screw mechanism is configured to perform pressurization and accumulator functions.

With reference to FIGS. 1 and 2, several single axle suspension systems are illustrated. It should be appreciated that the single axle suspension systems shown in FIGS. 1 and 2 may be located at the front end of a vehicle to control suspension movements and provide anti-roll/lean control for the front wheels of the vehicle, and additionally or alternatively, the single axle suspension systems may be located at the rear end of the vehicle to control suspension movements and provide anti-roll/lean control for the back wheels of the vehicle.

Each of the single axle suspension systems disclosed herein include a right damper and a left damper. The right and left dampers control (i.e., dampen) up and down (i.e., vertical) movements of the front or rear wheels of the vehicle. Thus, one single axle suspension system may be provided at the front of the vehicle and another single axle suspension system may be provided at the rear of the vehicle. The anti-roll/lean capabilities of the single axle suspension systems described herein will be explained in greater detail below; however, it should be appreciated that each single axle suspension system can operate independently and on its own and that each single axle suspension systems can be used to either augment or completely replace mechanical stabilizer bars/anti-roll bars. Such mechanical systems require relatively straight, unobstructed runs along each axle between the right and left dampers. Accordingly, the single axle suspension systems disclosed herein offer packaging benefits because the right and left dampers only need to be hydraulically connected to one another.

It should be appreciated that a vehicle may be equipped with two identical single axle suspension systems placed at the front and rear of the vehicle; however, other configurations are possible where the vehicle may include only one of the single axle suspension systems disclosed herein and a convention suspension system at the other axle, or where the single axle suspension system at the front of the vehicle is different from the single axle suspension system at the rear of the vehicle.

With reference to FIG. 1, a single axle suspension system 20 is illustrated with right and left dampers 22, 24. Each of the right and left dampers 22, 24 of the single axle suspension system 20 includes a damper housing 26, a piston rod 28, and a piston 30 that is mounted on the piston rod 28. The piston 30 is arranged in sliding engagement with the inside of the damper housing 26 such that the pistons 30 divide the damper housings 26 into first and second working chambers 32, 34, 36, 38. Although other configurations are possible, in the illustrated embodiment the pistons 30 in the right and left dampers 22, 24 are closed pistons with no fluid flow paths defined within or by their structure.

The single axle suspension system 20 also includes a first hydraulic line 40 that extends between and fluidly connects to the first working chamber 32 of the right damper 22 and the second working chamber 38 of the left damper 24 and a second hydraulic line 42 that extends between and fluidly connects to the second working chamber 34 of the right damper 22 and the first working chamber 36 of the left damper 24. As such, the first and second hydraulic lines 40, 42 cross-over one another at a cross-over point 90. In the illustrated example, the hydraulic lines 40, 42 are made of flexible tubing (e.g., hydraulic hoses), but other conduit structures and/or fluid passageways can be used alone or in combination with one another. The first hydraulic line 40 thus forms at least part of a first hydraulic circuit 48 that interconnects the first working chamber 32 of the right damper 22 and the second working chamber 38 of the left damper 24. Meanwhile, the second hydraulic line 42 forms at least part of a second hydraulic circuit 50 that interconnects the second working chambers 34 of the right damper 22 and the first working chamber 36 of the left damper 24.

The first hydraulic circuit 48 includes a first accumulator 66 and the second hydraulic circuit 50 includes a second accumulator 68. The first accumulator 66 is connected in fluid communication with the first hydraulic line 40 and the second accumulator 68 is connected in fluid communication with the second hydraulic line 42. The first and second accumulators 66, 68 may be constructed in a number of different ways. For example and without limitation, the first and second accumulators 66, 68 may have accumulation chambers and pressurized gas chambers that are separated by floating pistons or flexible membranes.

The first hydraulic circuit 48 also includes a first pair of variable flow control valves 70, 72 that are configured to regulate fluid flow between the first working chamber 32 of the right damper 22 and the second working chamber 38 of the left damper 24 with the first hydraulic circuit 48. Similarly, the second hydraulic circuit 50 also includes a second pair of variable flow control valves 74, 76 that are configured to regulate fluid flow between the first working chambers 36 of the left damper 24 and the second working chamber 34 of the right damper 22 with the second hydraulic circuit 50. The first variable flow control valve 70 is positioned between the first working chamber 32 of the right damper 22 and the first hydraulic line 40, while the second variable flow control valve 72 is positioned between the second working chamber 38 of the left damper 24 and the first hydraulic line 40. The third variable flow control valve 74 is positioned between the second working chamber 34 of the right damper 22 and the second hydraulic line 42, while the fourth variable flow control valve 76 is positioned between the first working chamber 36 of the left damper 24 and the second hydraulic line 42. By way of example and without limitation, the variable flow control valves 70, 72, 74, 76 may be electromechanical valves with a combination of passive spring-disk elements and a solenoid. The solenoid of the variable flow control valves 70, 72, 74, 76 may be electrically connected to and actuated by the controller 60 to change the damping characteristics of the right damper 22 and/or left damper 24 (e.g., to soften or firm up the ride).

The single axle suspension system 20 also includes a first pressurizing mechanism 46a that is connected in fluid communication with the first and second hydraulic circuits 48, 50 via a first pressure control line 86 and a second pressure control line 88, respectively. The first pressurizing mechanism 46a includes a dual chamber ball/screw mechanism 52 to adjust the volume of a pair of first and second variable volume chambers 54a, 54b, which allows the first pressurizing mechanism 46a to add and remove hydraulic fluid to and from the first and/or second hydraulic circuits 48, 50. The first and second variable volume chambers 54a, 54b are arranged at opposing ends of a cylinder housing 56. The first variable volume chamber 54a is arranged in fluid communication with the first hydraulic line 40 via the first pressure control line 86, while the second variable volume chamber 54b is arranged in fluid communication with the second hydraulic line 42 via the second pressure control line 88. The first and second variable volume chambers 54a, 54b are separated by a pair of driven pistons 58a, 58b, which are connected to a move together in unison with a threaded rod 60. The dual chamber ball-screw mechanisms 52 also includes a motor 62 that is arranged in threaded engagement with the threaded rod 60 and is therefore configured to drive the threaded rod 60 and therefore the pair of driven pistons 58a, 58b in first and second directions 15a, 15b within the cylinder housing 56. The first and second directions 15a, 15b are longitudinally opposed in relation to one another.

When the motor 62 drives the threaded rod 60 and thus the pair of driven pistons 58a, 58b in the first direction 15a, the volume of the first variable volume chamber 54a decreases while the volume of the second variable volume chamber 54b increases. This causes hydraulic fluid in the second pressure control line 88 to flow into the second variable volume chamber 54b and hydraulic fluid in the first variable volume chamber 54a to flow out into the first pressure control line 86, which decreases fluid pressure in the second pressure control line 88 and therefore decreases fluid pressure in the second hydraulic circuit 50 and increases fluid pressure in the first pressure control line 86 and therefore increases fluid pressure in the first hydraulic circuit 48. When the motor 62 drives the threaded rod 60 and thus the pair of driven pistons 58a, 58b in the second direction 15b, the volume of the first variable volume chamber 54a increases while the volume of the second variable volume chamber 54b decreases. This causes hydraulic fluid in the first pressure control line 86 to flow into the first variable volume chamber 54a and hydraulic fluid in the second variable volume chamber 54b to flow out into the second pressure control line 88, which decreases fluid pressure in the first pressure control line 86 and therefore decreases fluid pressure in the first hydraulic circuit 48 and increases fluid pressure in the second pressure control line 88 and therefore increases fluid pressure in the second hydraulic circuit 50.

The motor 62 is electrically connected to and controlled by controller (not shown) and rotates in clockwise or counterclockwise directions depending on the polarity of the electric current supplied to the motor 62 by the controller. This in turn drives linear/longitudinal movement of the threaded rod 60 in opposite directions. Thus, the first pressurizing mechanism 46a is configured to provide active roll control (i.e., roll resistance) by adding and removing hydraulic fluid to and from the first and second hydraulic circuits 48, 50 to increase and decrease pressure inside the first and second hydraulic circuits 48, 50 independent of damper movements.

The single axle suspension system 20 also includes a second pressurizing mechanism 46b that is connected in fluid communication with a reservoir 61 via a reservoir line 44. The second pressurizing mechanism 46b is a bi-directional pump that includes a first port 16a that is connected in fluid communication with the reservoir line 44 and second port 16b that is connected in fluid communication with a third hydraulic line 45. Although other configurations are possible, the bi-directional pump of the second pressurizing mechanism 46b shown in FIG. 1 has a single impeller that is rotatably driven by a motor. The motor of the second pressurizing mechanism 46b is configured to rotate the impeller in a first rotational direction (e.g., clockwise rotation) when the second pressurizing mechanism 46b is operating in a first working mode and the motor of the second pressurizing mechanism 46b is configured to rotate the impeller in a second rotational direction (e.g., counterclockwise rotation) when the second pressurizing mechanism 46b is operating in a second working mode. The first port 16a of the second pressurizing mechanism 46b acts as the pump inlet and the second port 16b of the second pressurizing mechanism 46b acts as the pump outlet when the second pressurizing mechanism 46b is operating in the first working mode. By contrast, the first port 16a of the second pressurizing mechanism 46b acts as a pump outlet and the second port 16b of the second pressurizing mechanism 46b acts as a pump inlet when the second pressurizing mechanism 46b is operating in the second working mode.

The third hydraulic line 45 and therefore the second port 16b of the second pressurizing mechanism 46 is connected to the first hydraulic line 40 and therefore the first hydraulic circuit 48 via a first charge line 93 that extends between the first hydraulic line 40 and the third hydraulic line 45. The third hydraulic line 45 and therefore the second port 16b of the second pressurizing mechanism 46 is also connected to the second hydraulic line 42 and therefore the second hydraulic circuit 50 via a second charge line 95 that extends between the second hydraulic line 42 and the third hydraulic line 45. Thus, the second pressurizing mechanism 46b is configured to pump hydraulic fluid out of the reservoir 61 and into the first and/or second hydraulic circuits 48, 50 to increase static pressure in the first and/or second hydraulic circuits 48, 50 when operating in the first working mode and the second pressurizing mechanism 46b is configured to pump hydraulic fluid out of the first and/or second hydraulic circuits 48, 50 to decrease static pressure in the first and/or second hydraulic circuits 48, 50 when operating in the second working mode.

The suspension system 20 illustrated in FIG. 1 also includes first and second bridge lines 92, 94 that extend between and interconnect the first hydraulic line 40 and therefore the first hydraulic circuit 48 and the second hydraulic line 42 and therefore the second hydraulic circuit 50 on each side of the cross-over point 90. In other words, the first bridge line 92 connects to the first and second hydraulic lines 40, 42 at positions located between the right damper 22 and the cross-over point 90, while the second bridge line 94 connects to the first and second hydraulic lines 40, 42 at positions located between the left damper 24 and the cross-over point 90.

The single axle suspension system 20 also includes a number of shut-off (i.e., on/off) valves 83, 85, 87, 89. In the illustrated example, a first shut-off valve 83 is positioned in the first charge line 93 between the first hydraulic line 40 and the third hydraulic line 45. A second shut-off valve 85 is positioned in the second charge line 94 between the second hydraulic line 42 and the third hydraulic line 145. Thus, the first shut-off valve 83 has an open position and a closed position and is therefore configured to control whether or not pressure in the first hydraulic circuit 48 is increased or decreased during operating of the second pressurizing mechanism 46b when the second pressurizing mechanism 46b is run in one of the first or second working modes. Similarly, the second shut-off valve 85 has an open position and a closed position and is therefore configured to control whether or not pressure in the second hydraulic circuit 50 is increased or decreased during operating of the second pressurizing mechanism 46b when the second pressurizing mechanism 46b is run in one of the first or second working modes. A third shut-off valve 87 is positioned in the first bridge line 92 between the first and second hydraulic lines 40, 42 and a fourth shut-off valve 89 is positioned in the second bridge line 94 between the first and second hydraulic lines 40, 42.

By way of example and without limitation, the shut-off valves 83, 85, 87, 89 may be electromechanical valves with a solenoid that may be electrically connected to and actuated by a controller (not shown) to open and close the shut-off valves shut-off valves 83, 85, 87, 89. When the shut-off valves 83, 85, 87, 89 are closed, a pressure differential between the first and second hydraulic circuits 48, 50 can be generated passively by movement of the pistons 30 in the right and left dampers 22, 24 and actively by actuation of the first pressurization mechanism 46a to provide roll resistance. This pressure differential will equalize when the shut-off valves 83, 85, 87, 89 are open, which can be used to provide a comfort setting/operating mode.

Thus, it should be appreciated and understood that the first pressurizing mechanism 46a is configured to provide active roll resistance in the first operating mode by effectively increasing the volume of the second hydraulic circuit 50 and effectively decreasing the volume of the first hydraulic circuit 48 when all of the shut-off valves 83, 85, 87, 89 are closed. This results in an increase in static pressure within the first hydraulic circuit 48 and a decrease in static pressure within the second hydraulic circuit 50, which is useful to resist body roll to the left when the vehicle is in a right-hand turn. The first pressurizing mechanism 46a is configured to provide active roll resistance in a second operating mode by effectively increasing the volume of the first hydraulic circuit 48 and effectively decreasing the volume of the second hydraulic circuit 50 when all of the shut-off valves 83, 85, 87, 98 are closed. This results in a decrease in static pressure within the first hydraulic circuit 48 and an increase in static pressure within the second hydraulic circuit 50, which is useful to resist body roll to the right when the vehicle is in a left-hand turn. As such, it should be appreciated that a pressure differential between the first and second hydraulic circuits 48, 50 can be generated and maintained to provide roll resistance when the shut-off valves 83, 85, 87, 89 are closed.

The bi-directional pump of the second pressurizing mechanism 46b can be run in the first working mode to pump fluid out of the reservoir 61 and into both of the first and second hydraulic circuits 48, 50 to increase the static pressure in the first and second hydraulic circuits 48, 50 when the first and second shut-off valves 83, 85 are open. Alternatively, the bi-directional pump of the second pressurizing mechanism 46b can be run in the first working mode to pump fluid out of the reservoir 61 and into just the first hydraulic circuit 48 or just the second hydraulic circuit 50 to increase the static pressure in just one of the first and second hydraulic circuits 48, 50 by opening just one of the first and second shut-off valves 83, 85.

Similarly, the bi-directional pump of the second pressurizing mechanism 46b can be run in the second working mode to pump fluid out of both of the first and second hydraulic circuits 48, 50 and into the reservoir 61 to reduce the static pressure in the first and second hydraulic circuits 48, 50 when the first and second shut-off valves 83, 85 are open. Alternatively, the bi-directional pump of the second pressurizing mechanism 46b can be run in the second working mode to pump fluid out of just the first hydraulic circuit 48 or just the second hydraulic circuit 50 and into the reservoir 61 to reduce the static pressure in just one of the first and second hydraulic circuits 48, 50 by opening just one of the first and second shut-off valves 83, 85.

The pressurizing mechanisms 46a, 46b, the variable flow control valves 70, 72, 74, 76, and the shut-off valves 83, 85, 87, 89 may all be electrically connected to and controlled by one or more controllers, which may include a processor and memory programmed to initiate/perform active roll control operations by actuating the first and second pressurizing mechanism 46a, 46b either simultaneously or independently. The controller(s) may be responsive to measurements taken by one or more pressure sensors 64. In the example shown in FIG. 1, a pressure sensor 64 is connected in fluid communication with the third hydraulic line 45. However, it should be appreciated that the pressure sensor 64 could alternatively be placed in fluid communication with the first and/or second hydraulic lines 40, 42, or at other locations.

FIG. 2 illustrates another single axle suspension system 120 that shares many of the same components as the single axle suspension system 20 illustrated in FIG. 1, but in FIG. 2 the first and second accumulators 66, 68 from FIG. 1 have been eliminated because the first and second pressurizing mechanisms 146a, 146b in FIG. 2 perform accumulator functions in addition to increasing or decreasing the static pressure in the first and second hydraulic circuits 148, 150. Rather than repeat the description set forth above, the following paragraphs describe the structure and function of the components in FIG. 2 that are new and/or different from those shown and described in connection with FIG. 1. It should be appreciated that the reference numbers in FIG. 2 are "100" series numbers (e.g., 120, 122, 124, etc.), but otherwise share the same base reference numbers as the corresponding elements in FIG. 1. Thus, the same description for elements 20 above applies to element 120 in FIG. 2 and so on and so forth, except as otherwise noted.

As noted above, the first and second pressurizing mechanisms 146a, 146b of the single axle suspension system 120 illustrated in FIG. 2 perform additional accumulator functions, which eliminates the need for separate accumulators attached to the first and second hydraulic circuits 148, 150. As shown in FIG. 2, each of the first and second pressurizing mechanisms 146a, 146b further includes floating pistons 180a, 180b that divide each variable volume chamber 154a, 154b into a fluid chamber 182a, 182b that is filled with hydraulic fluid and a gas chamber 184a, 184b that is filled with a compressible gas. The gas chamber 184a, 184b is positioned between the floating piston 180a, 180b and the driven piston 158a, 158b. The first fluid chamber 182a is arranged in fluid communication with the first pressure control line 186, while the second fluid chamber 182b is arranged in fluid communication with the second pressure control line 188. The floating pistons 180a, 180b allow the volume of the fluid chamber 182a, 182b to change/adjust in response to abrupt changes (increases and decreases) in pressure inside the first and second hydraulic lines 40, 42 caused by damper movements and there allows the first and second pressurizing mechanisms 146a, 146b in FIG. 2 perform accumulator functions in addition to increasing or decreasing the static pressure in the first and second hydraulic circuits 148, 150 when the motor 162 drives rotation of the threaded rod 160 of the ball-screw mechanism 152 to drive linear movement of the driven pistons 158a, 158b.

Many other modifications and variations of the present disclosure are possible in light of the above teachings and may be practiced otherwise than as specifically described while within the scope of the appended claims.

What is claimed is:

1. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
a first hydraulic circuit connecting the first working chamber of the right damper and the second working chamber of the left damper;
a second hydraulic circuit connecting the second working chamber of the right damper and the first working chamber of the left damper; and a first pressurizing mechanism including a first variable volume chamber that is arranged in fluid communication with the first hydraulic circuit, a second variable volume chamber that is arranged in fluid communication with the second hydraulic circuit, and a ball/screw mechanism that is arranged to increase and decrease a volumetric capacity of each of the first and second variable volume chambers and generate a pressure differential between the first and second hydraulic circuits independent of damper movements to adjust a roll resistance of the single axle suspension system.

2. The single axle suspension system set forth in claim 1, wherein the first and second variable volume chambers of the first pressurizing mechanism are separated by a pair of driven pistons that are moveably driven by the ball/screw mechanism in a first direction to increase the volumetric capacity of the second variable volume chamber while decreasing the volumetric capacity of the first variable volume chamber and a second direction to decrease the volumetric capacity of the second variable volume chamber while increasing the volumetric capacity of the first variable volume chamber.

3. The single axle suspension system set forth in claim 2, wherein movement of the pair of driven pistons in the first direction causes hydraulic fluid to flow out of the first variable volume chamber and into the first hydraulic circuit to increase static pressure in the first hydraulic circuit, wherein movement of the pair of driven pistons in the first direction also causes hydraulic fluid to flow into the second variable volume chamber from the second hydraulic circuits to decrease static pressure in the second hydraulic circuit, wherein movement of the pair of driven pistons in the second direction causes hydraulic fluid to flow into the first variable volume chamber from the first hydraulic circuit to decrease static pressure in the first hydraulic circuit, and wherein movement of the pair of driven pistons in the second direction also causes hydraulic fluid to flow out of the second variable volume chamber and into the second hydraulic circuit to increase static pressure in the second hydraulic circuit.

4. The single axle suspension system set forth in claim 3, wherein the ball/screw mechanism of the first pressurizing mechanism includes a motor arranged to rotate a threaded rod to operably drive movement of the pair of driven pistons in the first and second directions such that the pair of driven pistons move in unison with one another.

5. The single axle suspension system set forth in claim 4, wherein the first hydraulic circuit includes a first hydraulic line extending between and connected in fluid communication with the first working chamber of the right damper and the second working chamber of the left damper and wherein the second hydraulic circuit includes a second hydraulic line extending between and connected in fluid communication with the second working chamber of the right damper and the first working chamber of the left damper.

6. The single axle suspension system set forth in claim 5, further comprising:
a reservoir that is connected in fluid communication with a reservoir line;
a second pressurizing mechanism that is connected in fluid communication with the reservoir line and a third hydraulic line;
a first charge line extending between and connected in fluid communication with the first and third hydraulic lines; and
a second charge line extending between and connected in fluid communication with the second and third hydraulic lines.

7. The single axle suspension system set forth in claim 6, wherein the second pressurizing mechanism is a bi-directional pump.

8. The single axle suspension system set forth in claim 7, wherein the bi-directional pump of the second pressurizing mechanism has a first working mode where the bi-directional pump draws in hydraulic fluid from the reservoir line and discharges the hydraulic fluid into the third hydraulic line to increase static pressure in at least one of the first and second hydraulic circuits and wherein the bi-directional pump of the second pressurizing mechanism has a second working mode where the bi-directional pump draws in hydraulic fluid from the third hydraulic line and discharges the hydraulic fluid into the reservoir line to decrease static pressure in at least one of the first and second hydraulic circuits.

9. The single axle suspension system set forth in claim 6, further comprising:
a first shut-off valve positioned along the first charge line; and
a second shut-off valve positioned along the second charge line,
wherein each of the first and second shut-off valves are electromechanical valves with an open position and a closed position and are configured to permit the second pressurizing device to increase or decrease static pressure in only the first hydraulic circuit, only the second hydraulic circuit, or both the first and second hydraulic circuits.

10. The single axle suspension system set forth in claim 5, further comprising:
a first pressure control line extending between and connected in fluid communication with the first variable volume chamber of the first pressurizing mechanism and the first hydraulic line; and
a second pressure control line extending between and connected in fluid communication with the second variable volume chamber of the first pressurizing mechanism and the second hydraulic line.

11. The single axle suspension system set forth in claim 5, further comprising:
a first bridge line extending between and interconnecting the first and second hydraulic lines at a location adjacent to the right damper;
a second bridge line extending between and interconnecting the first and second hydraulic lines at a location adjacent to the left damper;
a third shut-off valve positioned along the first bridge line; and
a fourth shut-off valve positioned along the second bridge line,
wherein each of the third and fourth shut-off valves are electromechanical valves with an open position and a closed position and are configured to provide a comfort operating mode in the open position where hydraulic fluid can flow freely between the first and second hydraulic circuits.

12. A single axle suspension system, comprising:
right and left dampers each including a damper housing, a piston rod, and a piston that is mounted on the piston rod and arranged in sliding engagement inside the damper housing such that the piston divides the damper housing into first and second working chambers;

a first hydraulic line extending between and connecting the first working chamber of the right damper and the second working chamber of the left damper;

a second hydraulic line extending between and connecting the second working chamber of the right damper and the first working chamber of the left damper; and a first pressurizing mechanism including a first variable volume chamber that is connected to the first hydraulic line via a first pressure control line, a second variable volume chamber that is connected to the second hydraulic line via a second pressure control line, and a ball/screw mechanism that is arranged to increase and decrease a volumetric capacity of each of the first and second variable volume chambers and generate a pressure differential between the first and second hydraulic circuits independent of damper movements to adjust a roll resistance of the single axle suspension system.

13. The single axle suspension system set forth in claim 12, wherein the first and second variable volume chambers of the first pressurizing mechanism are separated by a pair of driven pistons that are moveably driven by the ball/screw mechanism in a first direction to increase the volumetric capacity of the second variable volume chamber while decreasing the volumetric capacity of the first variable volume chamber and a second direction to decrease the volumetric capacity of the second variable volume chamber while increasing the volumetric capacity of the first variable volume chamber.

14. The single axle suspension system set forth in claim 13, wherein movement of the pair of driven pistons in the first direction causes hydraulic fluid to flow out of the first variable volume chamber and into the first pressure control line to increase static pressure in the first hydraulic line, wherein movement of the pair of driven pistons in the first direction also causes hydraulic fluid to flow into the second variable volume chamber from the second pressure control line to decrease static pressure in the second hydraulic line, wherein movement of the pair of driven pistons in the second direction causes hydraulic fluid to flow into the first variable volume chamber from the first pressure control line to decrease static pressure in the first hydraulic line, and wherein movement of the pair of driven pistons in the second direction also causes hydraulic fluid to flow out of the second variable volume chamber and into the second pressure control line to increase static pressure in the second hydraulic line.

15. The single axle suspension system set forth in claim 14, wherein the ball/screw mechanism of the first pressurizing mechanism includes a motor arranged to rotate a threaded rod to operably drive movement of the pair of driven pistons in the first and second directions such that the pair of driven pistons move in unison with one another.

16. The single axle suspension system set forth in claim 12, further comprising:
a reservoir that is connected in fluid communication with a reservoir line;
a second pressurizing mechanism that is connected in fluid communication with the reservoir line and a third hydraulic line;
a first charge line extending between and connected in fluid communication with the first and third hydraulic lines; and
a second charge line extending between and connected in fluid communication with the second and third hydraulic lines.

17. The single axle suspension system set forth in claim 16, wherein the second pressurizing mechanism is a bi-directional pump that has a first working mode where the bi-directional pump draws in hydraulic fluid from the reservoir line and discharges the hydraulic fluid into the third hydraulic line to increase static pressure in at least one of the first and second hydraulic lines and a second working mode where the bi-directional pump draws in hydraulic fluid from the third hydraulic line and discharges the hydraulic fluid into the reservoir line to decrease static pressure in at least one of the first and second hydraulic lines.

18. The single axle suspension system set forth in claim 16, further comprising:
a first shut-off valve positioned along the first charge line; and
a second shut-off valve positioned along the second charge line,
wherein each of the first and second shut-off valves are electromechanical valves with an open position and a closed position and are configured to permit the second pressurizing device to increase or decrease static pressure in only the first hydraulic circuit, only the second hydraulic circuit, or both the first and second hydraulic circuits.

19. The single axle suspension system set forth in claim 12, further comprising:
a first bridge line extending between and interconnecting the first and second hydraulic lines at a location adjacent to the right damper;
a second bridge line extending between and interconnecting the first and second hydraulic lines at a location adjacent to the left damper;
a third shut-off valve positioned along the first bridge line; and
a fourth shut-off valve positioned along the second bridge line,
wherein each of the third and fourth shut-off valves are electromechanical valves with an open position and a closed position and are configured to provide a comfort operating mode in the open position where hydraulic fluid can flow freely between the first and second hydraulic circuits.

20. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
a first hydraulic circuit connecting the first working chamber of the right damper and the second working chamber of the left damper;
a second hydraulic circuit connecting the second working chamber of the right damper and the first working chamber of the left damper;
a first pressurizing mechanism including a first variable volume chamber that is arranged in fluid communication with the first hydraulic circuit, a second variable volume chamber that is arranged in fluid communication with the second hydraulic circuit, and a ball/screw mechanism that is arranged to increase and decrease a volumetric capacity of each of the first and second variable volume chambers and generate a pressure differential between the first and second hydraulic circuits independent of damper movements to adjust a roll resistance of the single axle suspension system; and
a second pressurizing mechanism including a bi-directional pump that is connected in fluid communication with a reservoir and the first and second hydraulic circuits to selectively increase or decrease static pressure in the first and second hydraulic circuits by adding or removing hydraulic fluid to and from the first and second hydraulic circuits.

\* \* \* \* \*